United States Patent
Cammarota et al.

(10) Patent No.: US 6,212,224 B1
(45) Date of Patent: Apr. 3, 2001

(54) MIL-STD-1553 BUFFER/DRIVER

(75) Inventors: Joseph P. Cammarota, Philadelphia; Edwin F. McGlynn, Huntingdon Valley, both of PA (US)

(73) Assignee: M Technologies, Inc., Horsham, PA (US)

( * ) Notice: Subject to any disclaimer, the term of this patent is extended or adjusted under 35 U.S.C. 154(b) by 0 days.

(21) Appl. No.: 09/158,835

(22) Filed: Sep. 23, 1998

Related U.S. Application Data

(60) Provisional application No. 60/069,414, filed on Dec. 18, 1997.

(51) Int. Cl.[7] .................................................. H04B 1/38
(52) U.S. Cl. .......................... 375/219; 455/73; 710/100
(58) Field of Search .................................. 375/211, 219, 375/220; 89/1.56; 710/1, 100, 126, 129; 326/86; 455/73

(56) References Cited

U.S. PATENT DOCUMENTS

| | | | |
|---|---|---|---|
| 4,654,844 | * 3/1987 | Mandello | 359/113 |
| 4,837,788 | * 6/1989 | Bird | 375/211 |
| 5,132,987 | 7/1992 | Motohashi et al. | 375/211 |
| 5,202,593 | * 4/1993 | Huang et al. | 326/86 |
| 5,349,683 | 9/1994 | Wu et al. | 714/801 |
| 5,490,254 | 2/1996 | Ziegler et al. | 710/100 |
| 5,657,458 | 8/1997 | Kondo et al. | 710/118 |
| 5,931,874 | * 8/1999 | Ebert et al. | 701/1 |

* cited by examiner

Primary Examiner—Stephen Chin
Assistant Examiner—Chieh M. Fan
(74) Attorney, Agent, or Firm—Gregory J. Gore

(57) ABSTRACT

A bus buffer conditions and amplifies bi-directional electrical signals on a line carrying MIL-STD 1553 bi-polar signals. The device includes a receiver with a threshold detector, a signal conditioner including a retiming circuit and an amplifying transmitter. The signal conditioner receives filtered bi-polar signal output from the receiver and transforms the signal into separate uni-polar digital outputs. The signal conditioner includes means for increasing the positive voltage state period of each uni-polar output voltage state until the beginning of the next output voltage state to eliminate an effective null bus period during a signal transmission. A timing circuit includes a clock and logic circuitry which retimes and combines the uni-polar signals to create a bi-polar digital output having retimed zero-crossing points which is then transmitted out to a second bus. Two bus buffers are connected between the first and second buses in reverse orientation to provide bidirectional capability. An arbitrator circuit sequences signals arriving at the device from both directions based on detection of a null bus period at either bus.

3 Claims, 5 Drawing Sheets

MIL-STD-1553 BUFFER/DRIVER

Priority based upon provisional application Ser. No. 60/069,414 filed on Dec. 18, 1997, entitled "MIL-STD-1553 BUFFER/DRIVER", is hereby claimed.

FIELD OF THE INVENTION

This invention relates to digital logic design. More specifically, it relates to a bi-directional bus buffer that is designed to operate according to the specifications of the MIL-STD-1553B data bus standard. Reference may be made to "MIL-STD-1553B: Department of Defense Interface Standard for Digital Time Division Command/Response Multiplex Data Bus", Sep. 21, 1978.

BACKGROUND OF THE INVENTION AND DESCRIPTION OF PRIOR ART

The United States Department of Defense requires the use of MIL-STD-1553B as the standard for communications between electronic modules on all military airplanes and other vehicles. MIL-STD-1553B defines an asynchronous serial, command/response digital data bus on which messages are time division multiplexed among users. The 1553 STD specifies all of the electrical characteristics of receivers, as well as the complete message transmission protocol. The 1553 protocol specifies that all continuous data transfers start with a positive excursion of the wave form from a null bus condition (no significant signal present). The 1553 protocol further requires a "no response time out" of 14 microseconds and a 12-microsecond maximum allowed for remote terminal (RT) response time. This system will therefore not tolerate an additional signal propagation delay of more than 2 microseconds. The transmission medium is a twisted wire cable pair. The standard uses bi-phase Manchester II encoded signals for which timing of the zero-crossing signals is critical.

There is a need in the art to permit several 1553 remote terminals to be operated on a secondary bus that forms a stub off of a main bus. There is a further need to permit the use of the 1553 standard in a system where the length of a single main bus, or the loading on it, might cause the bus performance to become marginal or undependable. Finally, there is a need to permit the extension of a 1553 application to farther locations without modifying an existing physical bus structure.

In order to satisfy such needs in the art, signal repeaters have been devised to extend the application of the 1553 standard. For the purposes of this application, a repeater is a device that receives an encoded input data signal from a first bus, decodes and stores the data temporarily, then encodes and retransmits the data out on a second bus. Such a repeater is produced by Cal Corporation of 1050 Morrison Drive, Ottawa, Ontario, Canada. However, these devices have specific disadvantages in terms of high data latency and messaging complexity, requiring additional software/firmware and more complex electronics than the present invention. Furthermore, such repeaters are unable to work within the 1553 specifications due to the long propagation delay (more than 2 microseconds) through the repeater. There is therefore a demand for a device that will meet the needs described above, while staying within the 1553 specifications.

SUMMARY OF THE INVENTION

The present invention is a bi-directional buffer/driver that meets the needs described above. The new buffer/driver is designed to operate in a bi-phase Manchester II encoded communication system with a differential bi-directional data bus using a single wire pair in accordance with specifications of MIL-STD-1553B. A buffer, unlike a repeater, does not decode or encode data. A buffer receives an encoded input data signal from a first bus, reshapes and amplifies the signal, and then retransmits the signal out on a second bus.

The output of the present buffer/amplifier drives the bus with the proper characteristics so that it is transparent to both the remote terminals and the main bus controller. As will be further described herein, the new bus buffer receives Manchester bi-phase encoded data, reconstitutes the received data signal, and transmits the reconstituted signal between a main bus and a secondary bus in either direction. Thus, an existing bus may be extended beyond the previous maximum communication distance without modifying the bus elements already installed.

Specifically, it is the object of the present invention to provide a MIL-STD-1553B buffer/driver which:

1. Presents impedance to the original main bus equal to that of a standard remote terminal.

2. Operates over the normal voltage operating range identified for a remote terminal in MIL-STD-1553B.

3. Reconstitutes the voltage waveform to full terminal output voltage as specified at point "A" of MIL-STD-1553B.

4. Stabilizes the zero-crossings of its output signal to be spaced in time by multiples of 500 nanoseconds, as specified by MIL-STD-1553B, when a distorted input has zero-crossings that are spaced within ±150 nanoseconds of a multiple of 500 nanoseconds, as permitted by MIL-STD-1553B.

5. Passes the reconstituted waveform on to a secondary bus to which the additional remote terminals are connected through stubs.

6. Contains input and output MIL-STD-1553 compliant transformers on each port.

7. Operates autonomously (needs no control input from any other device to function within a MIL-STD-1553B bus structure).

8. Senses the direction of traffic between the main bus and the secondary bus.

9. Operates on the data sequentially, i.e. on a first-come-first-served basis, such that the first of the main or secondary inputs to receive a signal controls the direction of the bus buffer, and the direction will not change until a null bus condition (no significant signal present) occurs.

10. Detects a null bus condition within 750 nanoseconds of the input bus returning to a value less than the receiver thresholds, and thus allows the bus buffer to reset for the next data transmission in either direction.

11. Receives and retransmits a data signal through the bus buffer with a propagation delay of less than one microsecond, so that the use of the buffer in systems containing remote terminals, which require up to 12 microseconds to respond with a status word, will not cause the total delay to exceed the "no response" timeout of 14 microseconds.

12. Provides a total system two-way delay due to the addition of the bus buffer that is less than 2 microseconds.

13. Does not decode or encode data, but only receives, reconstitutes, and retransmits a Manchester wave form that is transferred through it.

To fulfill the above-stated objects of the invention, the applicant has invented a serial bus buffer for conditioning and amplifying bi-directional electrical signals on a line carrying MIL-STD-1553 bi-polar signals, comprising: a receiver including a threshold detector, a signal conditioner including a retiming circuit, and a transmitter including an amplifier. The receiver is connected to the signal line at a first bus. A threshold detector within the receiver is responsive only to incoming bi-polar line signals having a preselected minimum positive or negative amplitude thus producing a filtered signal output. A signal conditioner receives the filtered bi-polar signal output from the receiver and comprises means for converting the filtered bi-polar signals into a first and second alternating uni-polar digital signals, one of the uni-polar signals having the timing of the positive excursion of the bi-polar signal beyond the minimum magnitude and the other uni-polar digital signal having the timing of the negative excursion of bi-polar signal beyond the minimal magnitude, each of the uni-polar signals having only two states, a zero-voltage state and a positive-voltage state. The signal conditioner further includes means for increasing the positive-voltage state period of each uni-polar signal pulse from the end of its positive-voltage state to the beginning of the next positive voltage state of the other uni-polar signal pulse so that no zero voltage state of either signal occurs at the same time. A timing circuit within said signal conditioner includes a periodic signal sampler having a clock and a logic circuit applied to each of the uni-polar signal outputs of the signal conditioner, producing digital outputs of "+1" or "−1" respectively when the positive-voltage state of the first or second uni-polar signal is detected at periodic sample points, the sampler producing a "0" output at all other sample points, the other sample points being a null bus period, the sampler further including means for combining this three-state output to produce a single, sampled, bi-polar digital output having zero crossing points occurring at multiples of the sample period. A transmitter comprises an amplifier connected to the signal sampler for amplifying and delivering the bi-polar sampler digital output to a second bus, the delivered signal on the second bus having substantially the same pulse width as the bi-polar signal wave excursions of the incoming line signal, and having zero crossing points occurring only at the sample points.

As another part of their invention, the applicants have invented, in combination, a first bus buffer as described above, further including a second bus buffer identical to the first bus buffer, the second bus buffer connected in parallel with the first bus buffer between the first and the second buses, but in reverse orientation with the receiver of second bus buffer connected to the second bus, such that the first bus buffer only receives signals on the signal line coming from a first direction and the second bus buffer only receives signals on the signal line coming from an opposite direction, the combined first and second bus buffers forming a bi-directional bus buffer circuit.

As yet another embodiment of the applicants' invention, the bi-directional bus buffer circuit further includes a direction arbitrator for sequencing incoming line signals from either direction. The arbitrator comprises first and second latch means connected in front of the receiver of the first bus buffer and connected in front of the receiver of the second bus buffer respectively, wherein the first and second latch means are connected to an arbitration circuit such that the latch means are open to receive incoming signals from either bus after a null bus output from the signal sampler is detected by the arbitration circuit after a minimum period, and such that when an incoming signal is first detected at one receiver, the latch means of the other receiver is closed.

Other objects, advantages, and novel features of the invention will become apparent from the following detailed description of the invention when considered in conjunction with the accompanying figures.

DETAILED DESCRIPTION OF A PREFERRED EMBODIMENT

Figure 1:
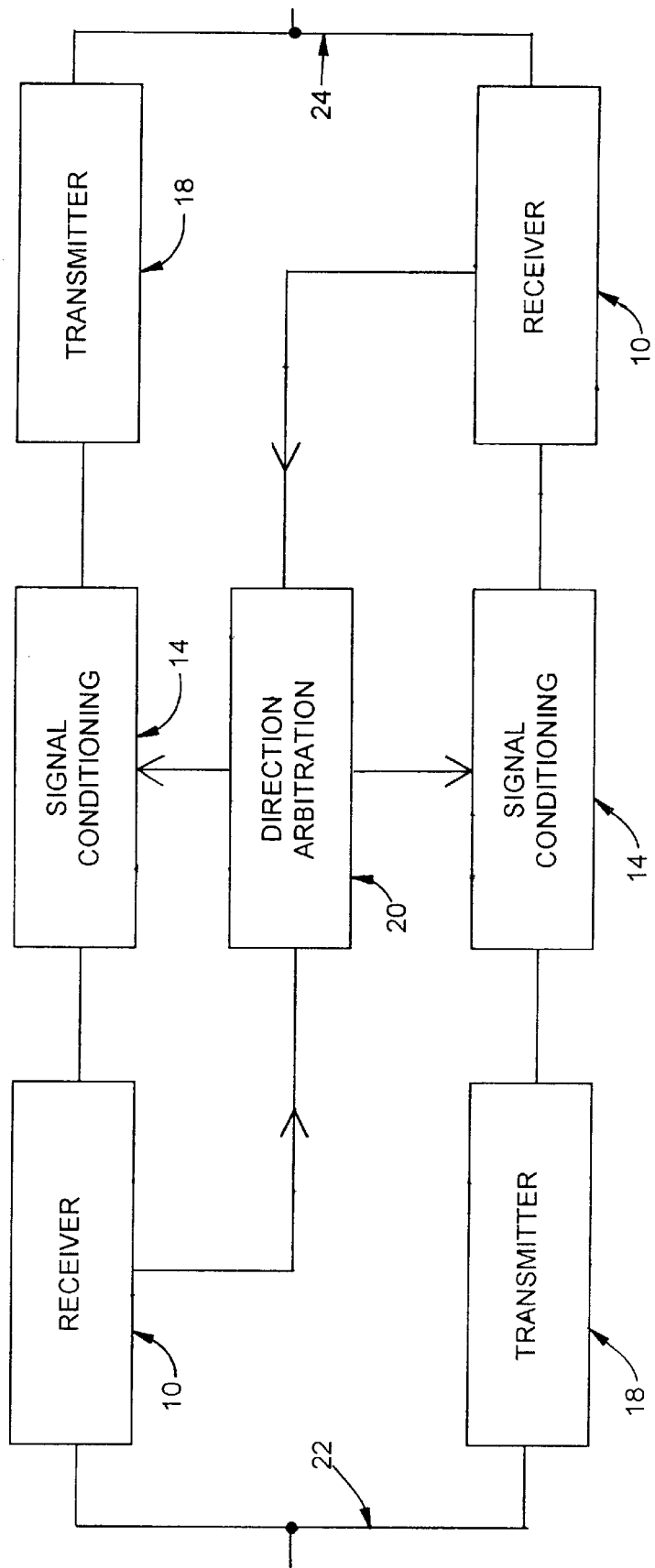
FIG. 1 is a block diagram which depicts functional components within the bi-directional bus buffer circuit.

FIG. 1 is a block diagram of an embodiment of the present invention. This new device is symmetrical: data may flow from a first bus 22 to a second bus 24, or data may flow from a second bus 24 to a first bus 22. During operation, one of two receiver circuits 10 accepts Manchester II bipolar signals from a 1553 data bus and detects positive and negative portions of the Manchester II signal input that exceed a specified minimum magnitude. One of two signal-conditioning circuits 14 then reconstitutes the incoming signal and prepares the signal for one of two transmitters 18 with the time spacing of zero-crossings corrected. Direction arbitration logic 20 detects the presence of bus controller and remote terminal signals, determines their direction, and arbitrates bus direction so that signals may be transmitted through the buffer/driver in either direction.

Figure 2:
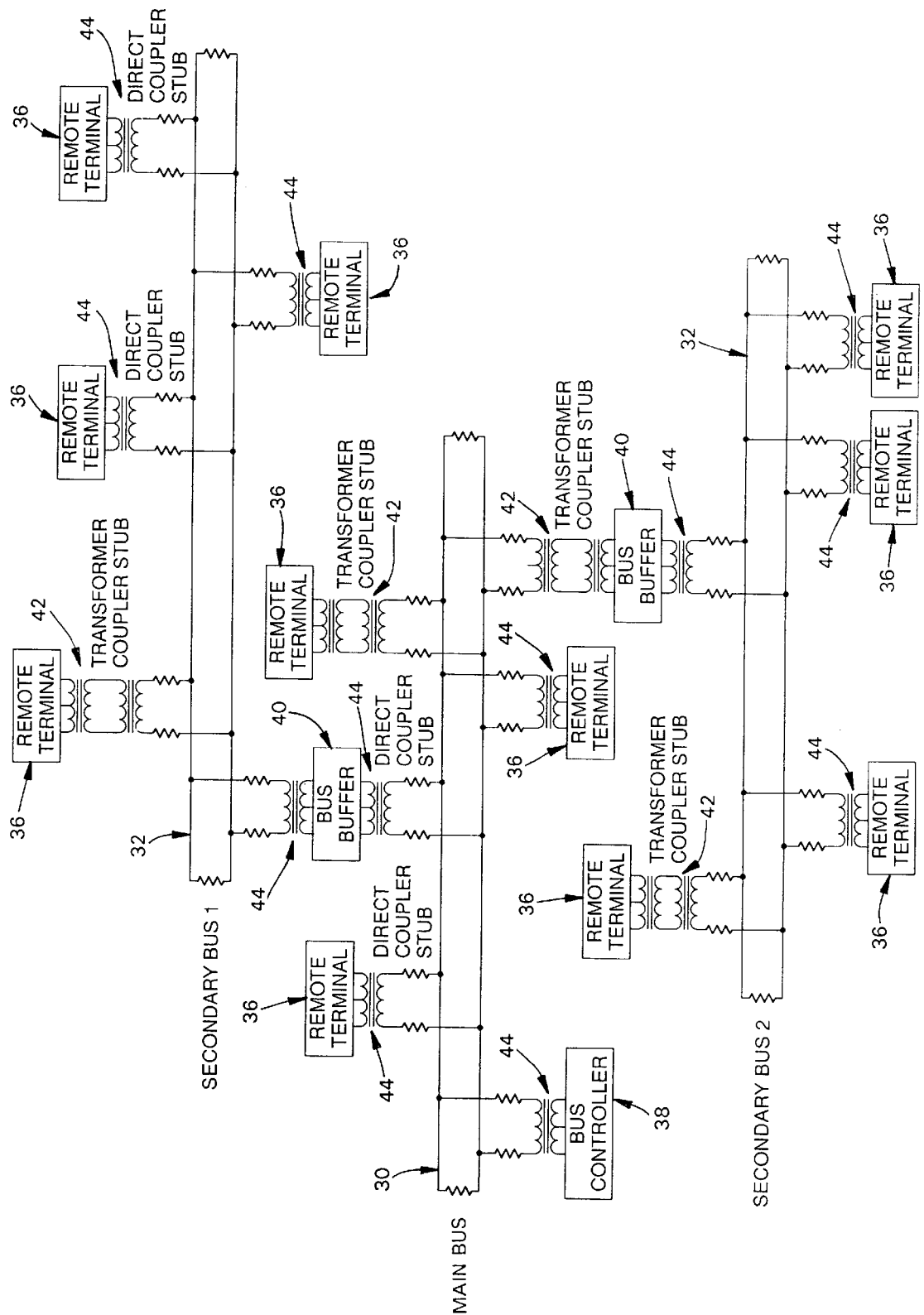
FIG. 2 is a diagram that illustrates electrical relationships among multiple buses in a typical application of the bus buffer of the present invention.

FIG. 2 shows the electrical interconnection of several buses using the present invention in a typical application. In this diagram, a main bus 30 is shown connected to two secondary buses 32 via bus buffers 40 built according to the methods of the present invention. A bus controller 38 is coupled to the main bus 30. One or more remote terminals are coupled to main bus 30 or to secondary buses 32. The bus buffers 40, remote terminals 36, and bus controller 38 may be coupled either through a direct coupler stub 44 or through a transformer-coupled stub 42.

Figure 3:
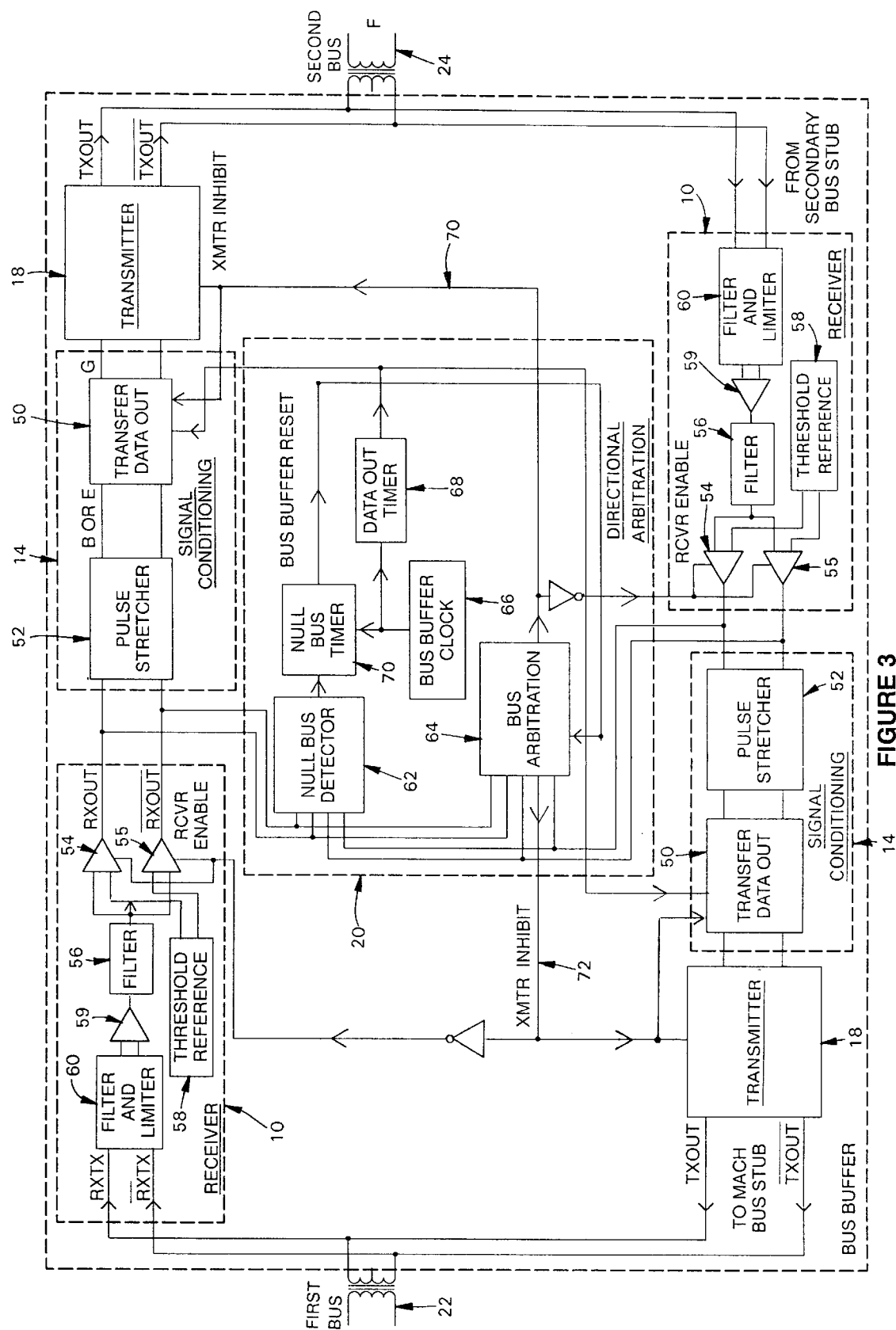
FIG. 3 is a schematic diagram of a preferred embodiment showing the circuits used to implement the present invention.

FIG. 3 shows circuit details of the functional blocks in FIG. 1. As stated above, a data signal may flow from a first bus 22 to a second bus 24, or from a second bus 24 to a first bus 22, in the same manner for either direction. An incoming signal passes through a filter and limiter 60 to be detected at a differential amplifier 59. The output of the differential amplifier 59 passes through filter 56 to threshold detectors 54 and 55. Threshold detector 54 detects positive pulses with magnitude greater than threshold reference 58, and threshold detector 55 detects negative pulses with magnitude greater than threshold reference 58. A pulse stretcher circuit 52 lengthens narrow pulses of either polarity. A transfer-data-out section 50 retimes the zero-crossings of the data signal so that they are separated by multiples of 500 nanoseconds. Differential transmitter 18 drives the reconstituted signal onto the second bus 24.

With continued reference to FIG. 3, direction arbitration logic 20 decides the direction of data signal flow. Both receivers 10 are coupled to bus arbitration logic 64 and null bus detector 62 to determine signal direction. MIL-STD-1553B stipulates that all continuous data transfers (command and status words plus data) are started with a positive excursion of the waveform from a null bus (the bus voltage is less than either positive or negative threshold as defined by input threshold). The reception of this positive excursion at either port on the bus buffer activates the receiver and transmitter in one direction, and disables the receiver and transmitter in the other direction using signals 70 and 72. These signals remain so long as there is a positive or negative voltage on the incoming bus that exceeds the detection threshold. Null bus detector logic 62 uses the incoming positive or negative receiver outputs to start null bus timer logic 70, which will count to its preset threshold value and reset the bus arbitration logic 64 when no positive or negative signals are on the bus (null bus condition). If the null bus condition ceases before the threshold value of the count is attained, the null bus timer logic 70 resets to its initial condition. Data out is retimed in the transfer-data-out section 50 by a data out timer 68 which is driven by a bus buffer clock 66.

Figure 4:
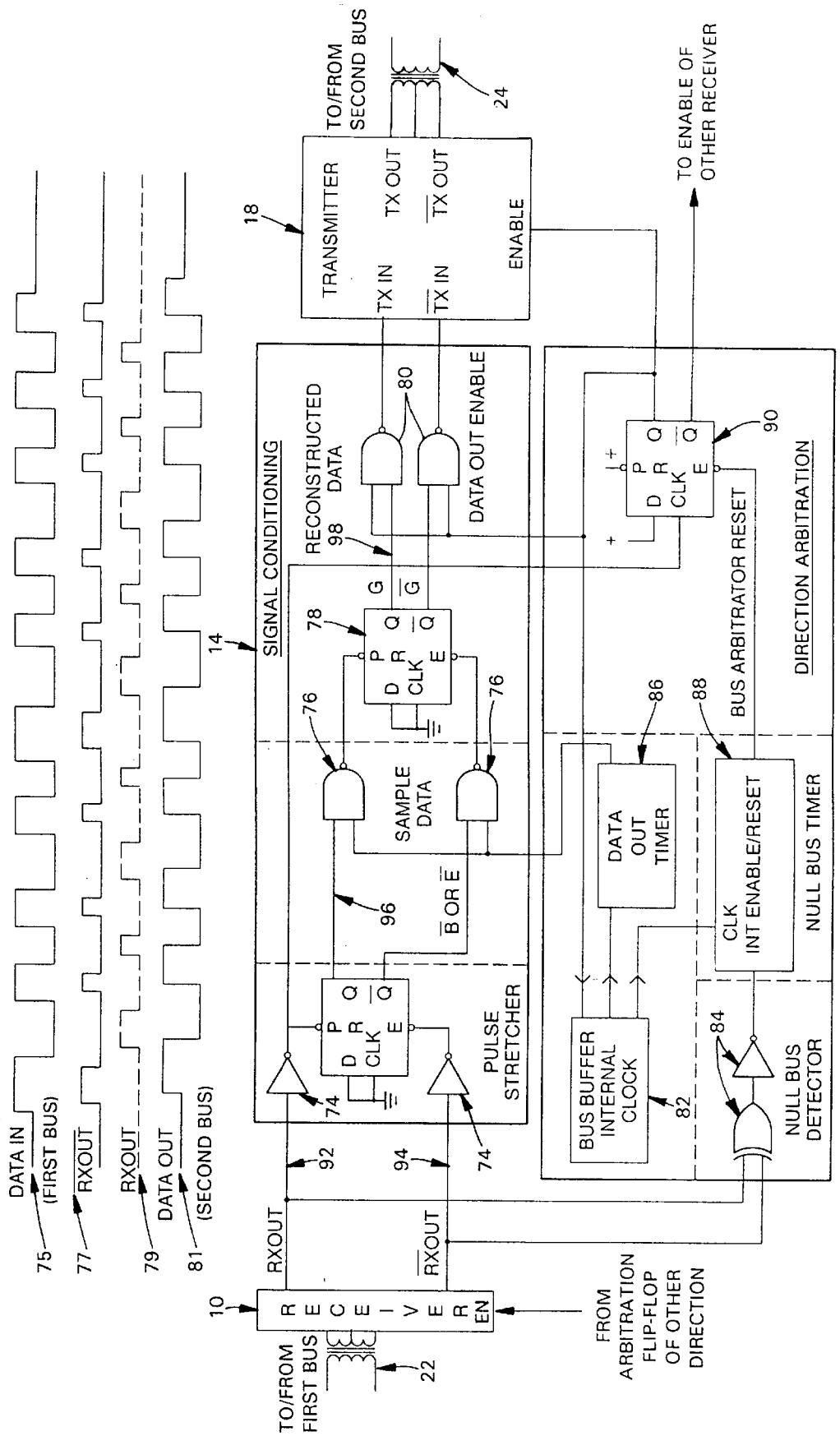
FIG. 4 is a diagram showing in more detail the signal conditioning and direction arbitration circuits of a preferred embodiment of the present invention.

The functions of all elements of the direction arbitration logic (62, 64, 66, 68, and 70) are divided into two symmetrical halves—one for each direction of data flow. FIG. 4 is a more detailed diagram of the signal conditioning 14 and half of the arbitration logic 20 associated with data flow from a first bus 22 to a second bus 24. Data flow in the opposite direction works in an identical manner.

Referring to FIG. 4, a receiver 10 receives a differential signal, such as the example of waveform 75, from a first bus 22. The output of receiver 10 is a pair of unipolar digital signals, such as the examples of waveforms 77 and 79. Waveform 77 is a digital "1" when the magnitude of the analog input signal positive voltage exceeds the input threshold voltage. Waveform 79 is a digital "1" when the magnitude of the analog input signal negative voltage exceeds the input threshold voltage. After signal conditioning and retiming, the result will be waveform 81 at a second bus 24.

Figure 5:
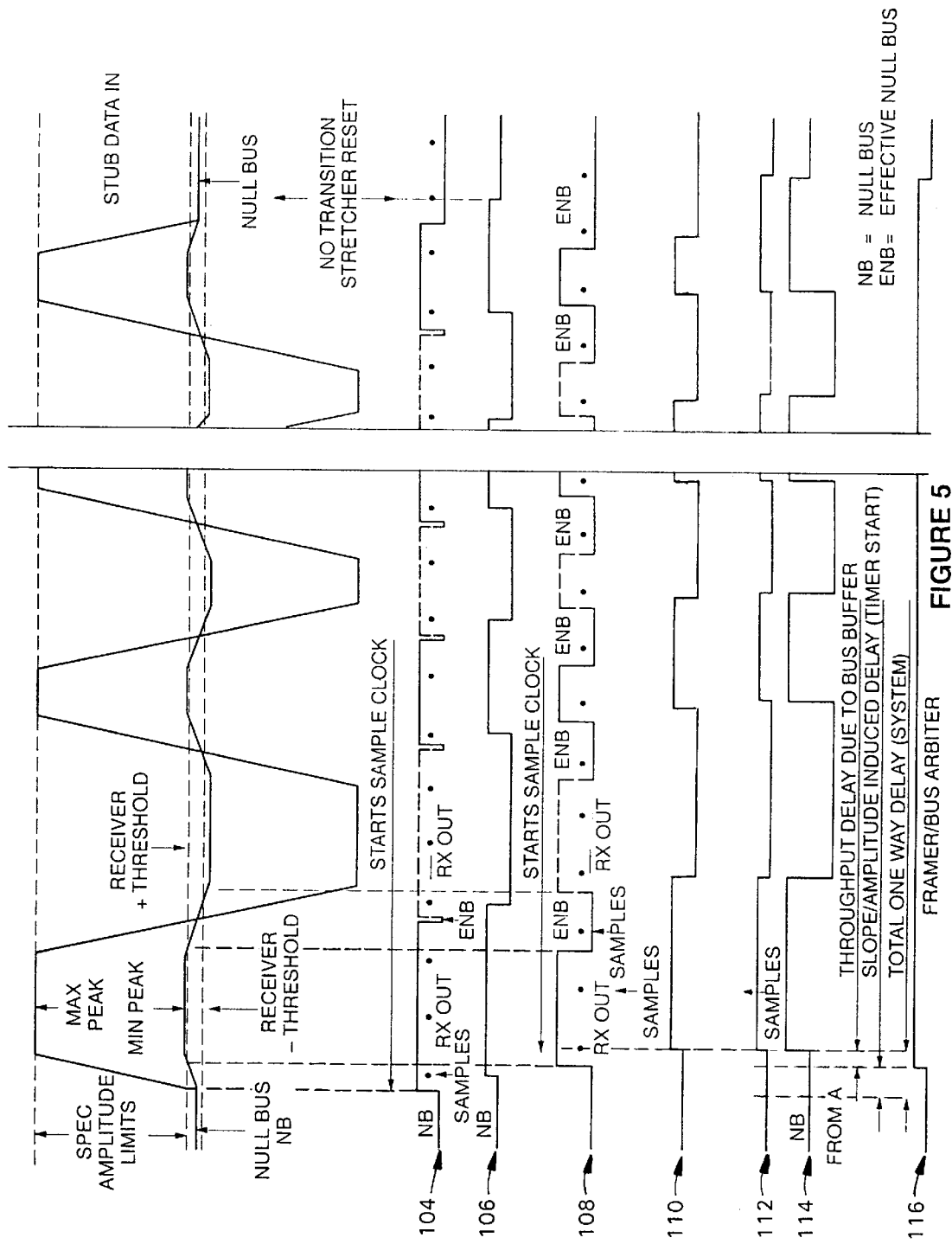
FIG. 5 is a chart showing signal waveforms at various points through the buffer/driver circuitry of the present invention.

Using the waveforms of FIG. 5, in conjunction with FIG. 4, shows details of the operation of signal conditioning and arbitration. A differential signal from a first bus 22 may be large, as in the example of waveform 100, or small, as in the example of waveform 102. These two waveforms are a depiction of the limit voltages and waveform rise and fall times allowed by the MIL-STD-1553B standard. The larger waveform 100 depicts the maximum peak-to-peak voltage with the worst case rise and fall times allowed. The smaller waveform 102 depicts the minimum peak-to-peak voltages at which the data bus system will operate properly. The horizontal dashed lines represent receiver thresholds, which are selected to minimize the amount of baseband noise that will be seen by the digital section of the bus buffer. The vertical dashed lines indicate the times when the waveforms cross the amplitude thresholds and are recognized by the receiver as of sufficient amplitude to generate output at locations 92 and 94. Waveform 104 is a superposition of the waveforms at locations 92 (the solid line) and 94 (the dashed line) that are generated by receiver 10 upon reception of waveform 100. (This is reasonable because locations 92 and 94 never have pulses at the same time.) Similarly, waveform 108 is a superposition of the waveforms at locations 92 (the solid line) and 94 (the dashed line) that are generated by receiver 10 upon reception of waveform 102. Waveforms 104 and 108 differ significantly because waveforms 100 and 102, respectively, transition through the voltage region bounded by the positive and negative minimum threshold specifications of MIL-STD-1553B, here called the "effective null bus" (ENB) condition, with very different timing. Nevertheless, the respective results shown in waveforms 106 and 110 at location 96 at the output of pulse stretcher flip-flop 74 are very similar. This is because the pulse stretcher flip-flop 74 is set by any pulse at location 92 and reset by any pulse at location 94, regardless of the width of the pulses. After retiming in sample data logic 76 and flip-flop 78, the resulting waveform 112 at location 98 and the resulting differential waveform 114 on a second bus 24 are identical for both cases, input waveform 100 or input waveform 102.

Half of the direction arbitration logic 20, which controls data flow from a first bus 22 to a second bus 24, is shown in FIG. 4. A null bus detector 84 enables a null bus timer 88 whenever there are no pulses at locations 92 and 94. If the timer 88 counts long enough before the null bus condition ends, then the timer 88 resets an arbitration flip-flop 90 with a brief pulse. The count threshold is set just long enough so that the output will not activate during ENB conditions. A data out timer 86 generates brief pulses to sample data via logic 76 at 500-nanosecond intervals as indicated by the dots in waveforms 104 and 108 of FIG. 5. An internally-generated clock 82 drives both the data out timer 86 and the null bus timer 88.

The arbitration flip-flop 90 is set by the first rising edge of input differential data on the first bus 22, as shown in waveform 116 of FIG. 5. The output of flip-flop 90 enables data out via logic 80, activates the associated transmitter 18, and disables the receiver 10 that is attached to the second bus 24 (not shown in FIG. 4) for data flowing in the other direction. The flip-flop 90 remains active until null bus timer 88 resets it as shown in waveform 116 of FIG. 5. The reset occurs when the null bus timer sees a null bus condition for 500 to 750 nanoseconds.

Because arbitration operates separately (and identically) for both directions of data flow, there is a small probability that signals on both buses will begin essentially simultaneously, and then both directions of data flow will be locked out by the arbitration flip-flop 90 associated with the opposite direction. This condition will clear when both buses return to a null bus condition, but transmission in both directions will be lost. However, the data-link protocol used by the bus controller and the remote terminals can tolerate this rare loss of transmissions.

In a MIL-STD-1553B system, the timing of the first positive excursion is not critical and is used only to set up the bus to transfer the Manchester encoded waveform. The Manchester II encoding is defined as requiring zero-crossing during each bit time with the direction of the zero-crossing determining whether the data is a "1" or "0". This invention does not use the zero-crossing as criteria for the existence of data which must be transferred. Since the bus buffer operates using the cessation of a null bus condition as the criteria, any excursions above the threshold are treated as proper data and will be transferred out to the second bus. This allows the bus buffer to put the data on the output bus with a delay equal to the time required only by the signal conditioning circuits and the receiver and semiconductor propagation delays. Invalid signals may be transmitted, but these are dropped by the validation function provided by the remote terminals. The speed of this system owes to the fact that the bus buffer does not have to wait for the first zero-crossing before it places the outgoing signal on the other bus. In a MIL-STD-1553 system, the time to the first zero-crossing is 1.5 microseconds which would cause an equal one-way delay or turn-around time of 3 microseconds. In the preferred embodiment, this timing is critical and is set to a value which will not contribute to any round trip system propagation delay in excess of 2 microseconds (from bus controller through bus buffer to remote terminal and back to the bus controller through the bus buffer).

The speed of the bus buffer of the present invention makes it fully operational within the requirements of MIL-STD-1553B. The high speed of the bus buffer is provided by the recognition that independent data validation is not required at the bus buffer since the RT device provides data signal validation. Therefore, the present device is able to receive and transmit reconstituted 1553 signals at its output terminals within 750 nanoseconds in either direction. Thus, this device avoids the "time out" 1553 application problem by providing a round trip propagation delay of less than two microseconds.

Furthermore, the present device allows for the operation of electronic systems containing multiple remote terminals to be mounted external to any vehicle or aircraft, such as recognizance pods, electronic countermeasures systems, weapon control and release systems, etc., such that the remote terminals communicate directly to the primary bus controller as if they were part of the primary bus. The external/extended system may use hard-wired RT addresses or a sub-system with an RT included to set the addresses of the other remote terminals as commanded by the primary bus/vehicle system. Thus, the buffer allows for the addition of new equipment to an existing MIL-STD-1553 bus structure without adding more stubs or length to the main bus. Since the remote terminals and the bus controllers on either side of the bus buffer are responsible for any validation or error, the bus buffer does not need to control the addressing of any remote terminals located on the secondary bus structure. The speed of the present invention derives from the fact that its purpose is only to buffer the main bus, correct zero-crossing errors, and restore the data signal to its full amplitude.

It should be understood that the above description discloses specific embodiments of the present invention and is for purposes of illustration only. There may be other modifications and changes obvious to those of ordinary skill in the art that fall within the scope of the present invention which should be limited only by the following claims and their legal equivalents.

What is claimed is:

1. A serial bus buffer for conditioning and amplifying electrical signals on a line carrying MIL-STD-1553 bi-polar signals, comprising:

a receiver connected to said signal line at a first bus, said receiver further including a threshold detector responsive only to incoming bi-polar line signals having a pre-selected minimum positive or negative amplitude, said receiver thereby producing a filtered bi-polar signal output;

a signal conditioner receiving said filtered bi-polar signal output from said receiver, comprising:

means for converting said filtered bi-polar signals into a first and second alternating uni-polar digital signals, one of said uni-polar signals having the timing of the positive excursion of said bi-polar signal beyond said minimum positive amplitude and the other uni-polar digital signal having the timing of the negative excursion of bi-polar signal beyond said minimal negative amplitude, each of said uni-polar signals having only two states, a zero-voltage state and a positive-voltage state;

means for extending the positive-voltage state period of each uni-polar signal from the end of its positive-voltage state to the beginning of the next positive-voltage state of the other uni-polar signal so that no zero voltage state of both signals occurs at the same time;

a timing circuit comprising a periodic signal sampler applied to both of said uni-polar signal outputs of said signal conditioner for retiming and combining them, said sampler including a clock and logic circuitry producing positive and negative digital outputs of "+1" or "−1" respectively when a positive-voltage state of said first or said second uni-polar signal is detected at periodic sample points, said sampler producing a "0" output null bus period, between all other sample points, said sampler further including means for combining said positive and negative digital outputs thus producing a bi-polar digital output having zero crossing points occurring only at said periodic sample points; and a transmitter comprising an amplifier connected to said signal conditioner for amplifying and delivering said bi-polar digital output of said timing circuit to a second bus, the delivered signal on said second bus having substantially the same pulse width as the bi-polar signal wave excursions of said incoming bi-polar line signal.

2. A bi-directional bus buffer circuit comprising a first bus buffer as described in claim 1 and a second bus buffer including a second receiver, a second signal conditioner and a second transmitter identical to the first bus buffer, wherein said second bus buffer is connected in parallel with said first bus buffer between said first and said second buses, but in reverse orientation with the second receiver of said second bus buffer connected to the second bus, such that said first bus buffer only receives signals on said signal line coming from a first direction and said second bus buffer only receives signals on said signal line coming from an opposite direction.

3. The bi-directional bus buffer circuit of claim 2, further including a direction arbitrator for sequencing incoming line signals from either direction, comprising:

first and second latch means connected in front of the receiver of said first bus buffer and connected in front of the receiver of the second bus buffer respectively, wherein said first and second latch means are controlled by an arbitration circuit such that said latch means are both open to receive incoming signals from either bus after a null bus output from their respective timing circuit is detected by said arbitration circuit for a minimum period, and such that when an incoming signal is first detected at one receiver, the latch means of the other receiver is closed by said arbitration circuit.

* * * * *